United States Patent

Eckhaus et al.

[11] 3,911,059
[45] Oct. 7, 1975

[54] PREPARATION OF ALKYLPHOSPHONOTHIOLATES

[75] Inventors: Sigmund R. Eckhaus, Baltimore, Md.; Jefferson C. Davis, Jr., Austin, Tex.; Bernard M. Zeffert, Baltimore, Md.; Thomas R. Moore, Hoboken, N.J.

[73] Assignee: The United States of America as represented by the Secretary of the Army, Washington, D.C.

[22] Filed: Oct. 12, 1960

[21] Appl. No.: 62,305

[52] U.S. Cl. ............... 260/989; 260/945; 260/973; 260/982; 260/989; 260/999; 424/211
[51] Int. Cl.² ........................................ C07F 9/32
[58] Field of Search ............. 260/461.110, 461.308, 260/461.310, 973, 982, 985, 989

[56] References Cited
UNITED STATES PATENTS

| | | | |
|---|---|---|---|
| 2,903,475 | 9/1959 | Horwitz | 260/983 X |
| 2,907,787 | 10/1959 | Hoffmann et al. | 260/982 |

FOREIGN PATENTS OR APPLICATIONS 847,550  9/1960  United Kingdom

OTHER PUBLICATIONS

Schrader, Angewandte Chemie, Vol. 69, No. 3, January 1957, p. 90.
Tammelin, ACTA Chem. Scand., 1957, pp. 1347–1348.

*Primary Examiner*—Leland A. Sebastian
*Attorney, Agent, or Firm*—Nathan Edelberg; Robert P. Gibson; Kenneth P. VanWyck

EXEMPLARY CLAIM

1. A method of preparing compounds of the formula

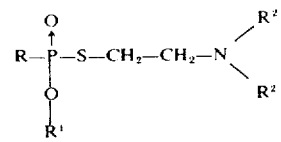

which comprises the steps of reacting a compound of the formula $R-PX_2$ with an alcohol of the formula $R^1-OH$ to produce a compound of the formula $R-P(OR^1)_2$ reacting this compound with an aminoalcohol of the formula

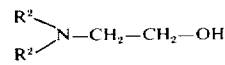

to produce a compound of the formula

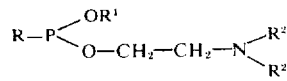

reacting this compound with sulfur to produce a compound of the formula

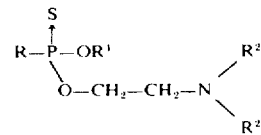

which is then isomerized at a temperature in the range 70°–200°C. to produce a compound of the formula

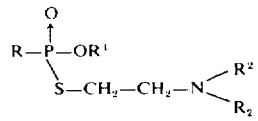

wherein X is selected from the group consisting of chloro, bromo, and iodo radicals, R, R¹, R² are lower alkyl radicals.

3 Claims, No Drawings

PREPARATION OF ALKYLPHOSPHONOTHIOLATES

The invention described herein may be manufactured and used by or for the Government of the United States of America for governmental purposes without the payment to use of any royalty thereon.

This invention relates to the manufacture of S-(2-dialkylaminoethyl) O-alkyl alkylphosphonothiolates. These compounds have the formula

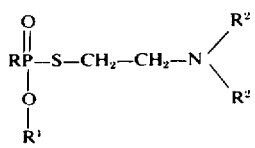

wherein R, $R^1$ and $R^2$ are lower alkyl groups. R is preferably methyl or ethyl, $R^1$ is preferably methyl, ethyl, isopropyl, n-propyl or butyl, and $R^2$ is preferably methyl, ethyl or isopropyl. Of all the compounds, S-(2-diisopropylaminoethyl) O-ethyl methylphosphonothiolate is regarded as the most important. The compounds have extremely high percutaneous toxicity to mammals and are useful as chemical warfare agents.

Our method involves the addition of sulfur to a 2-dialkylaminoethyl alkyl alkylphosphonite of the formula

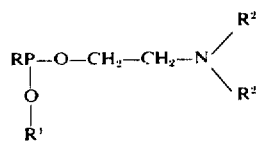

giving an O - (2-dialkylaminoethyl)-
O - alkyl alkylphosphonothioate of the formula

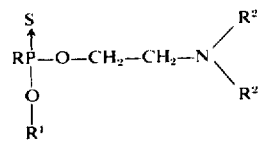

which is isomerized by heating to give our desired compounds.

We have found that if certain precautions are taken it is possible to secure consistent yields, in the range 95–98% of the theoretical, in the sulfur isomerization steps and the product is of such purity that no subsequent purification step is required.

The required precautions are:

1. The phosphonite must have a purity of at least 95% and should approach 98%. It is highly desirable, to secure the absence of harmful impurities, that it be prepared by certain steps which will be described later. The presence of water, the "half ester", $CH_3P(OH)_2$ and alcohol are especially to be avoided.

2. The sulfur must be moisture and acid free and in the rhombic form. Amorphous sulfur is unsatisfactory and flowers of sulfur is undesirable.

3. The theoretical amount of sulfur should not be exceeded.

4. The temperature and time during the isomerization step must be carefully controlled and correlated. (High temperatures for short periods may give better results than lower temperatures for longer periods.) 5. The exclusion of moisture and oxygen is essential. To this end, the process is conducted in an atmosphere of nitrogen or one of the inert gases.

To obtain phosphonite of the desired purity, it should be prepared in the following manner:

1. An alkydihalidephosphine $RPX_2$, preferably methyldichlorophosphine, $CH_3PCl_2$ or ethyldichlorophosphine, $C_2H_5PCl_2$, is reacted with an alcohol $R^1$ OH in the presence of a tertiary amine base to give a dialkyl alkylphosphonite, RP $(OR^1)_2$. A similar process step using anhydrous ammonia as the acid acceptor and a neutral reaction mixture results in high yields of a high purity product as is disclosed in the copending application of Donald H. Antonsen and Sigmund R. Eckhaus, Ser. No. 62,304, entitled "Preparation of Organic Phosphonites" filed on Oct. 12, 1960, now abandoned. As stated above, $R^1$ is preferably methyl, ethyl or isopropyl and X is selected from the group consisting of chloro, bromo and iodo radicals.

2. The dialkyl alkylphosphonite is next subjected to transesterification by heating with not more than (preferably less) equimolar quantities of a 2-dialkylaminoethanol

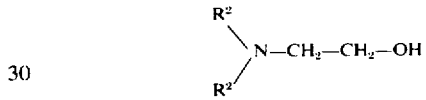

distilling off the alcohol $R^1$ OH and forming the mixed phosphonite

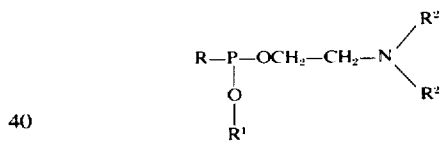

This is an equilibrium type reaction and the equilibrium mixture can be predicted based on random distribution. It is carried out in a manner similar to the transesterification of dialkyl alkylphosphonites with 2-alkylthio ethanols described by Friedrick W. Hoffman and Thomas R. Moore in U.S. Pat. No. 2,907,787, and also described by them in the Journal of the American Chemical Society, Vol. 80, pages 1050–1054 (1958). This series of steps produces a 2-dialkylaminoethyl alkyl alkylphosphonite which is ideally adapted for use in our process in that it is singularly free of impurities which lower the yield in our process.

If the required conditions listed above are maintained, there is no need for purification between the sulfur addition and isomerization steps.

3. The O-alkyl O-dialkylaminoalkyl alkylphosphonite is next subjected to a step of sulfurization. The amount of rhombic sulfur used should be about 98% of the theoretical amount. The temperature during the addition of sulfur can range from 5°–150°C. The range from 20°–40°C. is the preferred temperature range. The temperature is kept within the above ranges by immersing the reaction vessel in a cooling medium.

4. The product of the above step can be used in the final isomerization step without purification. The reaction vessel is heated up to the range 70°–200°C. for a period of time limited to the minimum necessary to secure isomerization. For example, at 150°C. isomerization is substantially complete in 5 minutes and is likewise substantially completed in 45 minutes at 125°C. for one of the typical products.

The over-all process is illustrated by the following equations:

1. $R-PX_2 + 2R'-OH \rightarrow R-P(OR')_2 + 2HX$

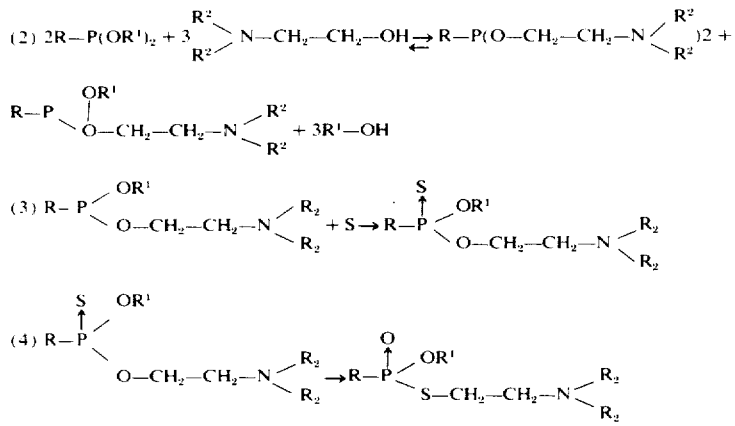

wherein the definitions for X, $R^1$, $R^2$ are the same as above.

The following examples illustrate our invention:

EXAMPLE I

Ethyl ether (1,000 ml) previously dried over sodium or calcium hydride and 234g. (2 moles) of redistilled dichloromethylphosphine were added to the reaction flask which has been previously flushed with dry nitrogen. A mixture of 193.2g. (4.2 moles) of absolute ethyl alcohol and 627.0g. (4.2 moles) of N,N-diethylaniline in the dropping funnel was added dropwise with stirring to the mixture of dichloromethylphosphine and ethyl ether. During addition of the alcohol, the reaction temperature was maintained between 20° to 30°C. by an ice bath, the system was flushed with dry nitrogen, and the exit gas line of the condenser was connected to a mercury bubbler. After the alcohol was added, the mixture was stirred for an additional 3 hours. The flask was removed from the reaction apparatus and was flushed with nitrogen, and the contents were poured into a Büchner funnel. The reaction flask was rinsed with 300 ml of dry ethyl ether, which was then added to the funnel. The liquid portion was separated from the solid N,N-diethylaniline hydrochloride using the vacuum produced by a water aspirator (a Dry Ice-acetone trap was located between the filtration flask and the water aspirator). The filter cake was washed with two 300 ml portions of dry ether.

The liquid reaction product was transferred to a 2 l. flask which had been previously flushed by dry nitrogen. The flask was connected to a 10-in. packed column surmounted by a stripping head, and the ethyl ether was distilled off at a spot temperature of approximately 60°C. During the removal of the ether, the exit gas line was sealed by a mercury bubbler to prevent entrance of atmospheric oxygen into the system. The remaining liquid was transferred to a 500 ml flask, and distillation in vacuo gave 223.2g. (1.64 moles) of diethyl methylphosphonite, b.p. 47°c/50 mm., $n_D$ 1.4173 (82.0% yield). Anal. calcd. for $C_5H_{13}O_2P$: C, 44.11; H, 9.62; P, 22.75. Found C, 44.5; H, 9.7; P, 22.78.

EXAMPLE II

Diethyl methylphosphonite 75g. (0.552 mole) was weighed into a 500 ml. round bottom flask fitted with a thermometer and mixed with 40.2g. (0.276 mole) of 2-diisopropylaminoethanol. The reaction flask was then flushed with dry nitrogen and heated slowly with a Glas-Col heating mantel for 55 minutes from 23° to 110°C., the reflux temperature of the reaction mixture. The ethanol formed in the reaction with continuously removed, During the removal of ethanol, the head temperature varied from 75° to 78.5°C. with the greater portion distilling at the higher temperature. An additional 65 minutes was required to complete the removal of ethanol. The temperature of the reaction mixture was 150°C. at the completion of the removal of alcohol. The reaction yielded 12.6g. (.374 mole) of ethanol (99.3% yield). Heating was discontinued, and dry nitrogen was flushed through the system while the pot cooled to 50°C. The distillation of the reaction mixture was continued in vacuo and gave the following yields:

Diethyl methylphosphonite, 33.7g. (.248 mole), b.p. 48°/50 mm. $n_D$ 1.4176 (recovery 45%). Ethyl 2-diisopropylaminoethyl methyl phosphonite, 45.6g (.207 mole) b.p. 54°/100μ, $n_D^{25}$ 1.4488 (yield 75%). Anal. calcd: for $C_{11}H_{26}O_2NP$: C, 56.14; H, 11.14; N, 5.95; P, 13.17. Found: C, 55.9; H, 11.4; N, 6.06; P, 13.6.

Bis(2-diisopropylaminoethyl) methylphosphonitee, 11.0g.(0.033 mole) b.p. 105°/100μ, $n_D^{25}$ 1.4598 (yield 12%).

The desired product ethyl 2-diisopropylaminoethyl methylphisphonite was then separated by fractional distillation under a nitrogen atmosphere for use in the following example:

EXAMPLE III

This example was performed in a three neck 4 l. pyrex flask with agitator, thermocouple well, addition tube for sulfur and addition line for nitrogen. The flask was immersed in a battery jar of ethylene glycol which was used as the heating bath. Cooling was controlled by adding dry ice to the glycol bath and heating was accomplished by a submerged electric heat coil.

The reaction flask was charged with 3221 grams (1.37 moles) of ethyl 2-diisopropylaminoethyl methyl phosphonite (99% purity) and a nitrogen purge was then started to maintain an inert atmosphere in the flask. Then 435g. (1.36 moles) of ground rhombic sulfur was slowly added using a vibrating feeder to regulate the flow rate. The heat of reaction was removed by the dry ice cooled bath. The reaction temperature was kept at approximately 30°C. by visual examination of the temperature recorder connected to the thermocouple and controlling the sulfur feed. The time for the completion of the sulfur addition was 60 minutes. Ten minutes was then allowed for completion of the reaction. The reactor was then heated as quickly as possible to 120°C. with the immersion heater and maintained at this temperature for 90 minutes. The reaction flask was then cooled, sampled and drained. The S-(2-diisopropylaminoethyl)-O-ethyl methylphosphonothiolate produced was analyzed as 97.6% pure.

In a manner similar to the above examples, other O-lower alkyl-S-di(lower alkyl) aminoethyl-lower alkyl phosphonothiolates may be prepared.

It is obvious that various changes may be made by persons skilled in this art. It is our intent that the invention herein described be limited only by the scope of the following claims.

We claim:

1. A method of preparing compounds of the formula

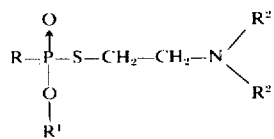

which comprises the steps of reacting a compound of the formula R—PX$_2$ with an alcohol of the formula R$^1$—OH to produce a compound of the formula R—P(OR$^1$)$_2$, reacting this compound with an aminoalcohol of the formula

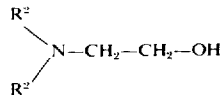

to produce a compound of the formula

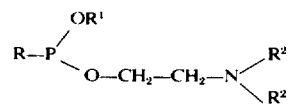

reacting this compound with sulfur to produce a compound of the formula

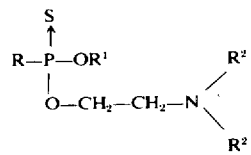

which is then isomerized at a temperature in the range 70°–200°C. to proudce a compound of the formula

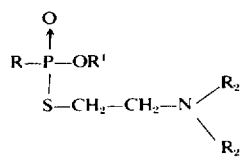

wherein X is selected from the group consisting of chloro, bromo, and iodo radicals, R, R$^1$, R$^2$ are lower alkyl radicals.

2. A method of preparing S-(2-diisopropylaminoethyl)-O-ethyl methylphosphonothiolate which comprises the steps of reacting dichloromethylphosphine with ethyl alcohol to produce diethyl methylphosphonite, reacting this compound with 2-diisopropylaminoethanol to give ethyl 2-diisopropylaminoethyl methylphosphonite, reacting this compound with sulfur to produce O-(2-diisopropylaminoethyl) O-ethyl methylphosphonothionate which is then immediately heated to the range 70°–200°C. and isomerized to produce S-(2-diisopropylaminoethyl)-O-ethyl methylphosphonothiolate.

3. In the preparation of O-alkyl S-dialkylaminoalkyl alkylphosphonothiolates the steps which consist in adding sulfur to alkyl dialkylaminoalkyl alkylphosphonnite and keeping the temperature within the range 20°–40°C., thereafter heating said reactants to the temperature range 70°–200°C. to produce O-alkyl-S-dialkylaminoalkyl alkylphosphonothiolates.

* * * * *